Figure 1:
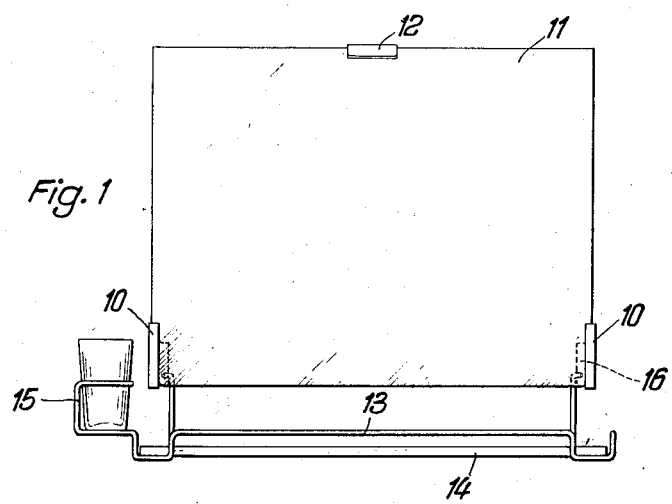

July 29, 1958     E. HAACK     2,845,242
PIVOTABLE SUPPORTING FIXTURES FOR TILTABLE MIRRORS
Filed April 19, 1955     2 Sheets-Sheet 1

*Inventor:*

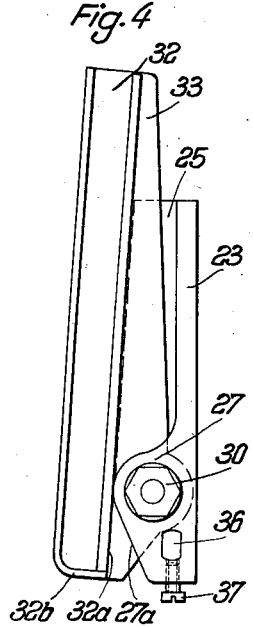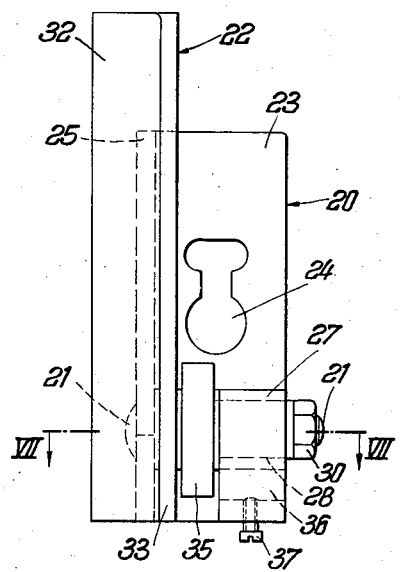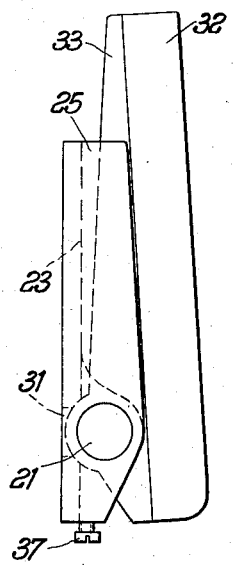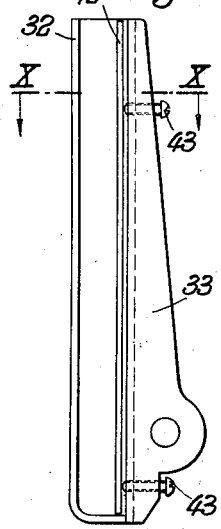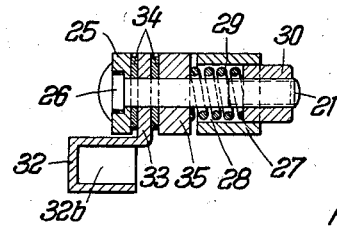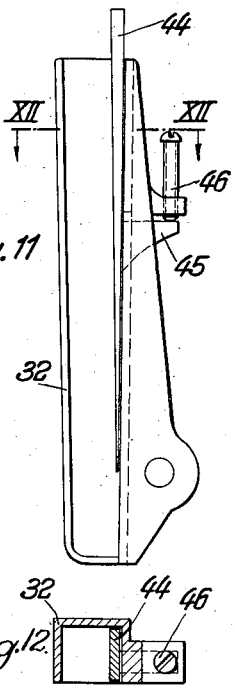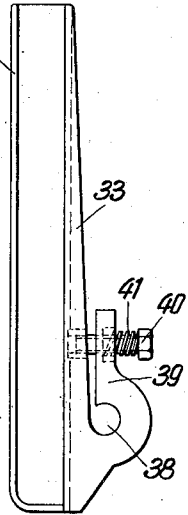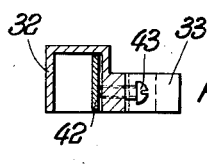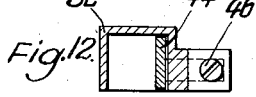

United States Patent Office 2,845,242
Patented July 29, 1958

2,845,242

PIVOTABLE SUPPORTING FIXTURES FOR TILTABLE MIRRORS

Erich Haack, deceased, late of Wilhelmshaven, Germany, by Gertrud Haack, sole heir, Wilhelmshaven, Germany, assignor to Rokal G. m. b. H., Lobberich, Lower Rhine, Germany Application April 19, 1955, Serial No. 502,479

1 Claim. (Cl. 248—28)

The invention refers to articulated mirror supporting means for pivotally supporting flat mirrors with at least one straight outer edge in such a way that the mirror can be tilted about an axis extending parallel to and adjacent said straight outer edge, said mirror supporting means frictionally holding the mirror in the desired tilted position. In particular the invention pertains to articulated mirror supporting means comprising two mirror holding arms which are positioned at the lower corners of the mirror and are pivotally joined by axially aligned pivot pins or bolts to fastening plate members rigidly fastened adjacent a flat supporting structure such as a wall, door or the like.

A great advantage of mirrors which can be tilted about their lower edge resides in the fact that already at a rather small angle of tilt a person looking into the mirror can observe his entire figure from top to toe. Tiltable mirrors are therefore especially suitable for bathrooms and washrooms not equipped with full length wall mirrors.

If a rectangular bathroom mirror of the customarily used size and weight is tilted about its lower edge, it will exert a very considerable torque. This torque is far greater than the torque exerted by a mirror of equal size and weight which is tilted about a horizontal axis extending midway between the upper and lower mirror edges. In tiltable mirrors fastened closely adjacent a flat supporting structure the torque will have to be counteracted by the frictional force of braking surfaces which have to be of very small size, inasmuch as it is desirable to position the mirror supporting means on the back of the wall mirror which, in its perpendicular untilted position, is only spaced a relatively small distance away from the wall.

Known types of articulated supporting means for tiltable mirrors can be so adjusted as to initially exert enough frictional force to hold the mirror in the desired tilted position. However, after relatively little wear of the frictional braking surfaces of the supporting means occurs, the frictional holding force decreases to such an extent that the mirror connot be held at the desired angle of tilt, but will swing forward under its own weight. The screws or pins of the supporting means which serve to hold the braking surfaces in tight engagement with one another will therefore have to be tightened from time to time.

It is the main object of the invention to eliminate the necessity for periodic tightening of the pivot screws by providing adjustable spring means designed to automatically take up any wear of the braking surface and to compensate any shrinkage or expansion of the joint parts due to temperature changes.

A further object of the invention is to provide articulated supporting means of the aforementioned type, which are so designed that the spring means for effecting self adjustment of the braking surfaces are located out of view in back of the mirror and occupy a minimum of space. Due to the absence of hygienically objectionable protruding surfaces of the mirror supporting means and due to the small distance of the mirror from the flat supporting surface a flat wall mirror tiltably supported by the new articulated supporting means is especially suitable for use in bathrooms and washrooms and can hardly be distinguished from ordinary non-tiltable flat mirrors fixedly mounted on the wall.

A still further object of the invention is to provide an articulated mirror holding means having channel portions engaging the mirror edge, said channel portions being provided with adjusting means for facilitating fastening the mirror edge therein. As is well known considerable pressure has to be exerted on the mirror to force it into the channel section to be securely held therein by friction. If this pressure is unskillfully applied, the mirror easily cracks and breaks. By providing the aforementioned adjusting means persons not familiar with mounting mirrors in channel supports will be enabled to install the mirror without difficulties.

Figure 2:
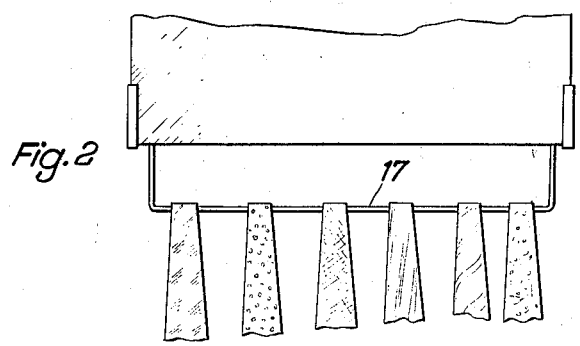

Other objects and advantages of this invention will become apparent from the following description taken in connection with the accompanying drawings wherein several embodiments of the invention are illustrated. In the drawings:

Figure 1 shows a rectangular bathroom mirror tiltably supported by two articulated supporting means mounted adjacent the lower mirror corners and provided with a holding fixture for holding a glass plate and a water tumbler, said holding fixture being held by the two articulated supports, Figure 2 a partial view of a rectangular tiltable toilet mirror provided with a holding fixture for neckties which is fastened to the articulated mirror supporting means in the same way as shown in Figure 1.

Figure 3:
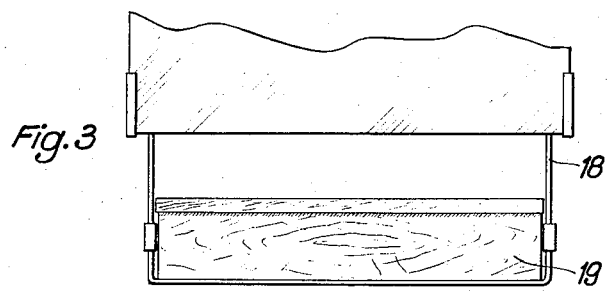

Figure 3 a partial view of a rectangular tiltable toilet mirror provided with a glove box holding fixture, which is fastened to the articulated mirror supporting means in the same way as in Figure 1, Figure 4 an articulated mirror supporting means for a left mirror corner in the position shown in Figure 1 and viewed from the right hand side of Figure 1 with the mirror omitted, Figure 5 shows a front view of the articulated mirror supporting means for a left corner in the position shown in Figure 1 with the mirror omitted, Figure 6 shows the articulated mirror supporting means for a left corner in the position shown in Figure 1 and viewed from the left hand side of Figure 1 with the mirror omitted, Figure 7 is a transverse sectional view taken along the line VII—VII of Figure 5, Figure 8 shows a modified form of a left hand articulated mirror supporting means in a view similar to Figure 4, Figure 9 shows a further modified form of a left hand articulated mirror supporting means having a channel section provided with clamping screws, Figure 10 is a transverse sectional view taken along the line X—X of Figure 9, Figure 11 shows a further modified form of a left hand articulated mirror supporting means having a tapered channel section provided with a slidable tapered insert for facilitating the fastening of the mirror edge in said channel section, Figure 12 is a transverse sectional view taken along the line XII—XII of Figure 11.

Figure 1 shows the arrangement of the mirror supporting fixtures 10 on the lower corners of a rectangular flat bathroom mirror 11. The upper edge of the mirror is provided with a handle 12 by means of which the mirror can be tilted to the desired position, in which it is held by braking or friction surface provided on the fixed portion and on the pivoting portion of the articulated supporting means. A holding fixture 13 for a glass plate 14 is arranged below the mirror. The holding fixture 13 is of well known type consisting of strong wire which is preferably chromium plated. One end of this wire is bent to a loop 15 for holding a tumbler. The free ends 16 of the wire extend behind the mirror and are inserted into apertures of the plate members of the mirror supporting means, as will be described in detail further below.

Figure 2 shows a mirror with a holding fixture 17 serving as a necktie holder and Figure 3 shows a mirror with a holding fixture 18 holding a glove box. The free wire ends of both of these holding fixtures are inserted into suitable apertures of the plate members (not shown) of the articulated mirror supporting means in the same way as in Figure 1.

The articulated mirror supporting means shown in Figures 4 to 7 comprises a fastening plate member 20 and a channel type mirror supporting arm 22 pivotally supported on the plate member by means of a pivot bolt extending at a right angle to the channel section of the supporting arm. Figures 4 to 7 show an articulated supporting means fastened to the lower left corner of the mirror.

The plate member 20 comprises a plate 23 provided with one or more slots 24 for the bolt with which the plate member is fastened to a supporting surface, which usually is the wall of a bathroom or a washroom. The slot 24 of the left hand plate shown preferably comprises a lower circular portion and an upper T-shaped portion. The plate is provided with a flat web portion 25 protruding at a right angle therefrom. The web 25 has a bore with a square countersunk portion for receiving the square neck portion of pivot bolt 21. On the right hand side of the web 25 the plate 23 is provided with a protruding portion 27 having a bore 28 positioned in alignment with the web bore but having a larger diameter than the web bore. This bore serves as a support for the spring means 29 which in the modification shown in Figures 4 to 7 is a cylindrical coil spring. The bore also serves as a guide for the cylindrical outer surface of the nut 30 fastened on the free end of pivot screw 21. Between the web portion 25 and the protruding portion 27 an aperture 31 is provided in the portion of the plate located below the pivot screw.

The mirror supporting arm 22 comprises a channel section 32 and a web portion 33. The web portion 33 extends at a right angle from the inner wall of the channel section 32 and is provided with a bore for the pivot screw 21.

The channel section 32 extends at a right angle to the pivot screw 21 and is closed at its lower end by a transverse wall 32b. The channel section engages the lower part of the side edge of the mirror with the extreme outer end of the lower mirror edge resting on the transverse wall 32b.

The side walls of the channel section 32 tightly engage the front and back surfaces of the mirror edge portion, a tight fit being assured either by pressing the channel section on the mirror edge, which in a manner known per se can be covered with a fabric or plastic strip, or by providing special clamping means located between one side of the mirror edge and one of the side walls of the channel section. These clamping means by which an adjustable pressure can be exerted on the mirror edge will be described in detail further below.

The location of the different parts in the assembled mirror supporting means can best be seen in Figure 7. Between the adjacent friction or braking surfaces on the inner side of web portion 25 and the left side of web portion 33 a friction disk 34 of fibre or some other suitable material is mounted on the pivot bolt. A similar friction disk 34 is provided on the right hand side of web 33. The last mentioned friction disk also engages a clamping block 35, which may consist of fibre or a wear resisting plastic material. This clamping block which is provided with a bore for the pivot bolt protrudes with its lower portion into aperture 31 and is thereby prevented from rotating on the pivot bolt. The block 35 can, however, be moved axially as the aperture 31 is wider than the block. One side of this block serves as supporting surface for spring 29 and its opposite side serves as one of the braking surfaces and is in engagement with the right hand friction disk 34. As shown in Figure 7, the parts 25, 33, 34 and 35 of the assembled supporting means are pressed together by spring 29 with the engaging surfaces of these parts forming the aforementioned braking surfaces. It is noted that by tightening or loosening nut 30 the spring pressure can be adjusted as desired. The pivot screw 21 is prevented from turning by the square neck portion of the bolt held in a corresponding recess of web portion 25. The pivot screw 21 is held in alignment both by the bore in web 25 and by the nut 30 which slidably fits into the bore 28 of the protruding portion 27.

The web portion 25 can be slightly tapered, so that the mirror in its upright position is slightly tilted towards the wall.

The protruding portion 27 has in addition to the bore 28 an aperture 36 extending parallel to the bore 28 and located in the installed position of the plate member 20 below the bore 28. In this aperture 36 the free ends of the holding fixtures 13, 17 and 18 shown in Figures 1 to 3 are inserted and can be securely fastened therein by means of a set screw 37.

Figures 4 and 5 show the mirror supporting arm 22 in its extreme upright position in which the inner side wall of the channel section rests on the tapered side wall of web 25.

The amount of forward tilt of the mirror supporting arm 22 is limited by the configuration of the lower tapered surface 27a of web portion 25, which surface acts as a stop surface for the lower end of the inner side wall 32a of channel section 32. This stop surface 27a is so inclined that in the extreme tilted position of the mirror, a person using the mirror can observe his entire figure from top to toe.

The mirror supporting means for the right hand corner, which is not shown, is, of course, a symmetrical counterpart of the supporting means for the left hand corner with the web portion 25 located at the right hand side of the plate member.

Figure 8 shows a modified form of an articulated mirror supporting means with a spring means exerting a resilient braking pressure. In this figure the plate member and the pivot screw, which is non-rotatably fastened to the plate member, are not shown. The web portion 33 of the mirror holding arm is provided with a slotted hub portion 39 and a bore 38 surrounding the pivot bolt (not shown). By tightening a clamping screw 40, which is threaded into the web portion 33, the pressure of a biassing spring 41 bearing against the outer end of the slotted hub portion 39 can be adjusted to any desired degree, thus increasing or lowering the friction between the outer surface of the pivot screw (not shown) and the wall of bore 38. The plate member coacting with a mirror arm of the type shown in Figure 8 can, of course, be of simpler construction as that shown in Figures 4 to 7, inasmuch as the nut 30, the block 35 and the spring 29 can be omitted with the pivot screw being, for instance, screwed directly into a threaded hole provided in the protruding portion 27.

It is noted that instead of fixedly mounting the pivot screw on the plate member, the pivot screw can also be locked to the mirror supporting arm. In this case instead of slotting the web portion of the mirror arm the protruding portion of the plate member can be slotted and be provided with a clamping screw similar as shown in Figure 8. In this case the braking surfaces are formed by the outer surface of the pivot bolt and the wall of the bore of said protruding portion, lateral movement of the pivot bolt being prevented by a nut or other suitable means.

Figures 9 and 10 show an arrangement for facilitating fastening the channel section 32 to the mirror. Instead of exerting a heavy pressure on the channel section when trying to force it on the mirror edge, the channel section is loosely slid over the mirror edge which is then securely clamped in the channel section by tightening the clamping screws 43. These clamping screws are threaded into the channel section 33 and, when tightened, bear against a strip member 42. This strip member 42 can be made of any suitable material which must, however, be rigid at the points of contact with the clamping screws which press it into tight engagement with the mirror edge portion previously inserted into the channel.

Figures 11 and 12 show a further way of fastening the mirror edge in the channel section 32 by means of a strip member. The side walls of the channel section diverge at a slight angle and a correspondingly tapered strip 44 is inserted between the mirror edge portion and one side wall of said channel portion. The tapered strip 44 is provided with an ear-like lug 45 which protrudes through a corresponding slot of the channel wall located adjacent the web portion 33. A set screw 46 is threaded into a lug fastened to the outer side of the channel wall above the slot. This set screw extends parallel to the channel wall and, when tightened, bears against the upper face of the ear-like lug 45 thereby pressing the tapered strip towards the closed end of the channel section into closer engagement with said mirror edge.

Although various preferred embodiments of the invention have been herein illustrated and described, it will be evident to those skilled in the art that various modifications may be made in the details of construction without departing from the principles set forth in the description and the claim.

What is claimed is:

An articulated joint for forwardly tilting mirrors having a horizontally disposed lower edge pivoted about an axis adjacent and parallel to said lower edge and for frictionally holding said mirror in its tilted position, said joint comprising two horizontally spaced mirror holding arms having channel sections surrounding portions of the side edges of the mirror adjacent the ends of said lower edge, substantially rectangular fastening plate members adapted to be rigidly affixed to an upright wall surface, each of said fastening plate members being provided with a web protruding at right angles from the mirror facing side of said fastening plate member, a bolt for pivotally connecting one of said arms to one of said fastening plates, said web extending at a right angle to said bolt and providing a support for the head end of said bolt with the inner side of said web providing a braking surface, a projecting portion protruding from the surface of said fastening plate member at a distance from said web, said projecting portion having a bore for receiving spring means and a cylindrical nut which is fastened to the free end of said bolt, and a clamping block with a bore for said bolt being interposed between said projecting portion and said arm, the side of said block facing said arm serving as braking surface and the opposite side of said block being in contact with said spring means, said block having a lower portion protruding into an aperture in said fastening plate member, said aperture being of a configuration to allow lateral movement of said lower protruding portion but preventing rotational movement thereof.

References Cited in the file of this patent

UNITED STATES PATENTS

| 1,345,018 | Macfarland et al. | June 29, 1920 |
| 1,895,560 | Weir | Jan. 31, 1933 |
| 2,069,067 | Hoffman | Jan. 26, 1937 |
| 2,621,882 | Fletcher | Dec. 16, 1952 |
| 2,628,807 | Lincoln | Feb. 17, 1953 |

FOREIGN PATENTS

| 212,142 | Great Britain | 1924 |
| 341,481 | Great Britain | 1931 |